US010771855B1

(12) United States Patent
Joliveau et al.

(10) Patent No.: US 10,771,855 B1
(45) Date of Patent: Sep. 8, 2020

(54) DEEP CHARACTERIZATION OF CONTENT PLAYBACK SYSTEMS

(71) Applicant: Amazon Technologies, Inc., Seattle, WA (US)

(72) Inventors: Marc Joliveau, Seattle, WA (US); Christopher Longo, Seattle, WA (US)

(73) Assignee: Amazon Technologies, Inc., Seattle, WA (US)

(*) Notice: Subject to any disclaimer, the term of this patent is extended or adjusted under 35 U.S.C. 154(b) by 0 days.

(21) Appl. No.: 15/483,650

(22) Filed: Apr. 10, 2017

(51) Int. Cl.
*H04N 21/647* (2011.01)
*H04N 21/466* (2011.01)
*H04N 21/462* (2011.01)
*H04N 21/4363* (2011.01)

(52) U.S. Cl.
CPC . *H04N 21/64738* (2013.01); *H04N 21/43635* (2013.01); *H04N 21/4621* (2013.01); *H04N 21/4662* (2013.01)

(58) Field of Classification Search
None
See application file for complete search history.

(56) References Cited

U.S. PATENT DOCUMENTS

| | | | |
|---|---|---|---|
| 8,341,255 B2 | 12/2012 | Gopalakrishnan | |
| 9,137,278 B2 | 9/2015 | Strasman | |
| 9,444,870 B2 | 9/2016 | Phillips et al. | |
| 10,178,043 B1* | 1/2019 | Ganjam | H04L 65/4084 |
| 10,277,928 B1 | 4/2019 | Joliveau et al. | |
| 2008/0043697 A1 | 2/2008 | Huomo et al. | |
| 2008/0273591 A1 | 11/2008 | Brooks et al. | |
| 2009/0031384 A1 | 1/2009 | Brooks et al. | |
| 2009/0184962 A1* | 7/2009 | Kuriakose | G06F 3/14 345/428 |
| 2010/0135419 A1 | 6/2010 | Doser et al. | |
| 2011/0082946 A1 | 4/2011 | Gopalakrishnan | |
| 2011/0235703 A1 | 9/2011 | Labrozzi et al. | |
| 2012/0054876 A1 | 3/2012 | Johansson | |
| 2012/0278496 A1 | 11/2012 | Hsu | |
| 2012/0278833 A1* | 11/2012 | Tam | H04N 21/2343 725/31 |
| 2013/0067109 A1 | 3/2013 | Dong et al. | |
| 2013/0080267 A1 | 3/2013 | McGowan | |
| 2013/0091249 A1 | 4/2013 | McHugh et al. | |
| 2013/0156094 A1 | 6/2013 | Syed et al. | |
| 2013/0179588 A1 | 7/2013 | McCarthy et al. | |

(Continued)

OTHER PUBLICATIONS

U.S. Office Action dated Jun. 16, 2017 issued in U.S. Appl. No. 14/876,449.

(Continued)

*Primary Examiner* — Mulugeta Mengesha
*Assistant Examiner* — Charles N Hicks
(74) *Attorney, Agent, or Firm* — Weaver Austin Villeneuve & Sampson LLP

(57) ABSTRACT

Techniques are described for obtaining and analyzing deep characterization information for a content playback system with multiple interconnected components. A server can determine a subset of configurations of requested media content that are compatible with the capabilities of the components of the content playback system. Limiting a client device to select media content fragments corresponding to the subset of configurations can be enforced through the use of constrained manifest files.

17 Claims, 5 Drawing Sheets

(56) References Cited

U.S. PATENT DOCUMENTS

| | | |
|---|---|---|
| 2013/0198342 A1 | 8/2013 | Xu et al. |
| 2013/0212223 A1 | 8/2013 | Ur |
| 2013/0219423 A1 | 8/2013 | Prickett et al. |
| 2013/0254341 A1 | 9/2013 | Ramakrishnan |
| 2014/0098182 A1* | 4/2014 | Kramarenko .......... H04N 7/141 348/14.12 |
| 2014/0129618 A1 | 5/2014 | Panje et al. |
| 2014/0310424 A1 | 10/2014 | Andersson et al. |
| 2014/0365889 A1 | 12/2014 | Lipman et al. |
| 2015/0019968 A1 | 1/2015 | Roberts et al. |
| 2015/0085875 A1 | 3/2015 | Phillips et al. |
| 2015/0089557 A1 | 3/2015 | Busse |
| 2015/0101003 A1* | 4/2015 | Bull ................ H04N 21/64761 725/116 |
| 2015/0113407 A1 | 4/2015 | Hoffert et al. |
| 2015/0146012 A1 | 5/2015 | Shipley et al. |
| 2015/0317353 A1* | 11/2015 | Zavesky ................ G06F 16/24 707/736 |
| 2016/0088322 A1* | 3/2016 | Horev ................ H04N 21/8456 725/14 |
| 2016/0127260 A1 | 5/2016 | Gordon |
| 2016/0286249 A1* | 9/2016 | Phillips .............. H04N 21/2385 |
| 2016/0294898 A1 | 10/2016 | Wheelock |
| 2017/0078744 A1* | 3/2017 | VanBlon .......... H04N 21/44218 |

OTHER PUBLICATIONS

U.S. Final Office Action dated Oct. 18, 2017 issued in U.S. Appl. No. 14/876,449.

U.S. Office Action dated Jul. 14, 2016 issued in U.S. Appl. No. 14/876,449.

U.S. Final Office Action dated Mar. 3, 2017 issued in U.S. Appl. No. 14/876,449.

U.S. Appl. No. 14/876,449, filed Oct. 6, 2015, Joliveau, et al.

U.S. Office Action dated Mar. 30, 2018 issued in U.S. Appl. No. 14/876,449.

U.S. Final Office Action dated Oct. 19, 2018 issued in U.S. Appl. No. 14/876,449.

U.S. Notice of Allowance dated Jan. 28, 2019 issued in U.S. Appl. No. 14/876,449.

* cited by examiner

DEEP CHARACTERIZATION OF CONTENT PLAYBACK SYSTEMS

BACKGROUND

Consumers have an ever-increasing array of options for consuming media content, in terms of the types of media content, providers of the media content, and devices for consuming the media content. Media content providers are becoming increasingly sophisticated and effective at providing media content quickly and reliably to consumers.

Media content (e.g., movies, television shows, videos, music, and electronic books) is often streamed over networks using adaptive bitrate streaming for playback on a client device. Adaptive bitrate streaming typically involves determining the client device's bandwidth and hardware resources (e.g., available central processing unit (CPU) capacity) in real time and adjusting the quality of the media content that is requested from a media server for playback on the client device to account for changes in the bandwidth and hardware resources. Fragments at different quality levels, or bitrates, of the media content detailed in manifest data are requested by the client device and stored in a buffer for playback. Because the heuristic algorithms for requesting fragments are implemented on the client device, the media server is limited in its ability to influence the playback of the media content.

DETAILED DESCRIPTION

This disclosure describes techniques for delivering media content to a requesting device in a manner that better accounts for the playback capabilities of the content playback system of which the device is included in. A content playback system can be a single device, such as a tablet device that integrates multiple components into a single physical package. A content playback system can also have multiple discrete components, such as a gaming console connected to a legacy television, each with their own set of internal components.

Queryable content playback system parameters obtained through a deep characterization process are used by a server side heuristic algorithm to determine a subset of the available configurations of the media content to be provided for selection. Content playback system capabilities that support an available configuration can be determined through a direct or indirect mapping to parameters in the deep characterization information. Content playback system capabilities that cannot be mapped directly or indirectly can be inferred by a heuristic function that takes as inputs multiple parameters in the deep characterization information. The server identifies the subset of available configurations in a constrained manifest data that is provided to the requesting device and guides the selections made by a heuristic algorithm at the requesting device. As a result, for the same media content, different content playback systems may receive different constrained manifest data.

Figure 1:
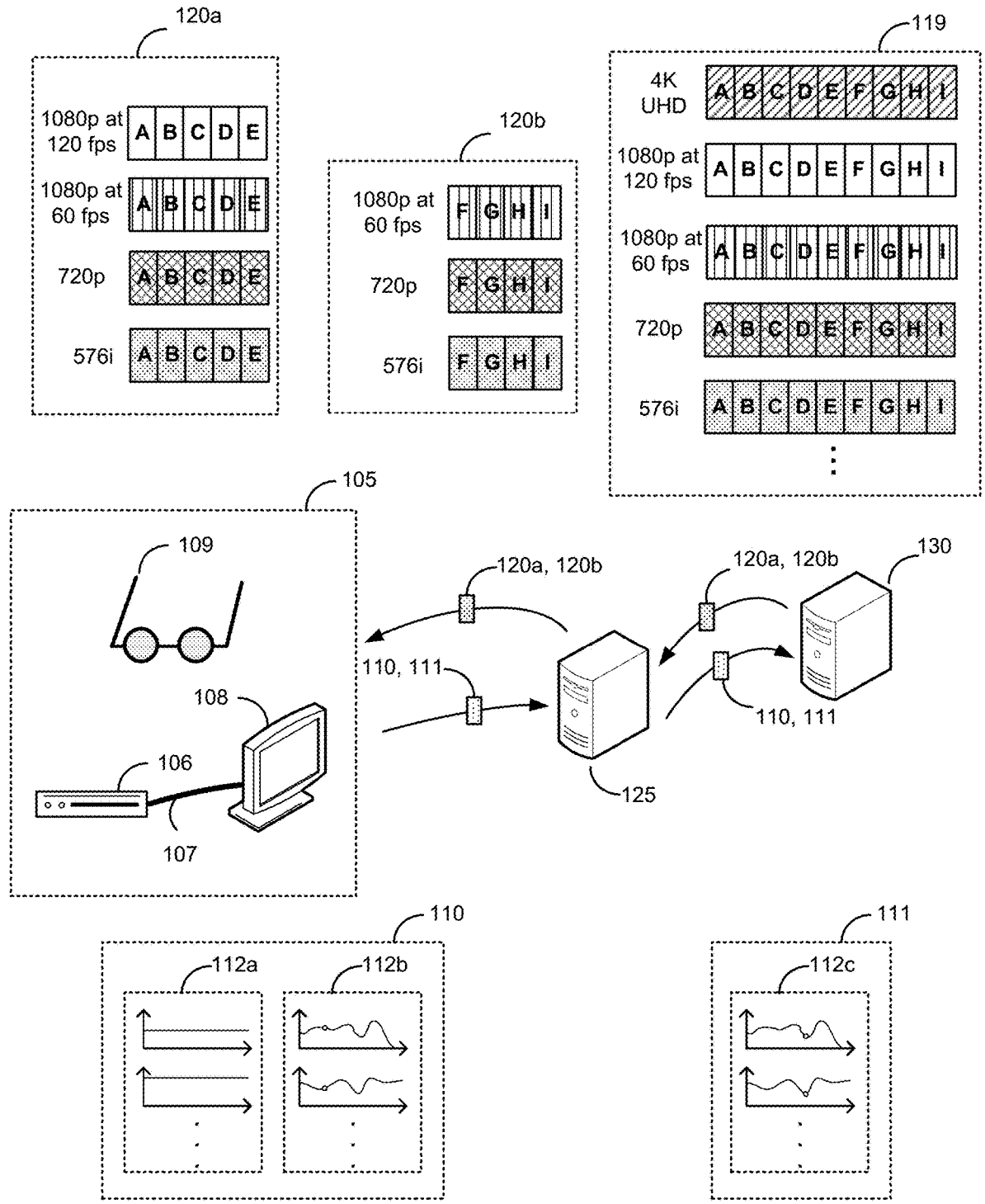
FIG. 1 illustrates an example of constrained manifests for media content playback.

FIG. 1 illustrates an example of a media server using the deep characterization of a content playback system to determine a constrained manifest. A content playback system 105 includes a client device 106, a multimedia interface 107, and a display 108. In the depicted example, client device 106 is a gaming console with connectivity to a content delivery network, multimedia interface 107 is a wired cable compliant with the high-definition multimedia interface (HDMI) standard, and display 108 is a plasma TV.

When content playback system 105 requests media content, media server 125 provides manifest data indicating fragments, or segments, of the playback of the media content available at different bitrates or frames per second (fps).

Media server 125 can be an edge server of a content delivery network (CDN) that caches fragments of the media content for streaming to requesting playback systems, and that receives fragments from other components of the CDN (e.g., origin servers). Media server 125 communicates with manifest server 130, which can be an application server that can be part of or external to the CDN. In some implementations, the functionality of both media server 125 and manifest server 130 can be implemented within the same server, both within the same CDN, or across multiple servers.

Media server 125 provides deep characterization information 110 regarding content playback system 105 to manifest server 130. Deep characterization information 110 is obtained by a deep characterization process operating on content playback system 105 (e.g., on client device 106). The deep characterization process may begin when a content playback application is started on content playback system 105. During this phase of operation, the deep characterization process collects all queryable parameters for client device 106, multimedia interface 107, and display 108. The parameters may be queried through the operating system (e.g., Android, iOS, Mac OS, Windows, UNIX, Fire OS, etc.) and/or available application programming interfaces (e.g., the Settings.System API call in the Android operating system). The parameters obtained by the deep characterization process span a wide range of categories relating to various system components including, for example, the power system, graphics system, networking system, audio system, interface system, etc. Each category of parameters may include both static and dynamic parameters.

Static parameters 112a relate to characteristics of content playback system 105 that are fixed over the course of playback of the media content. Examples of static parameters include maximum battery capacity (e.g., milliamp hours), battery vendor, maximum CPU speed, CPU vendor, firmware version (including any identified bugs/incompatibilities associated with the firmware version), screen size, supported screen resolutions, display dynamic range, color depth, available APIs, device model, device manufacturer, operating system version, firmware version, OEM ID, wireless carrier, high-bandwidth digital content protection (HDCP) support, audio 5.1/7.1 support, content application playback version, web browser version, etc.

Dynamic parameters 112b relate to characteristics of content playback system 105 that vary over the course of the content playback. Examples of dynamic parameters include current CPU speed, current battery life, current memory available, screen brightness, network bandwidth conditions, currently connected Bluetooth/USB peripherals, Wi-Fi signal frequency, received signal strength indicator (RSSI) for a Wi-Fi signal, Wi-Fi noise levels, user preferences, etc.

After the static and dynamic parameters are obtained, they are transmitted to media server 125 by piggybacking on an existing communication channel, or through a separate back channel.

Manifest server 130 provides manifest data 119 to media server 125. Manifest data 119 indicates the superset of available fragments of the media content at various bit rates and frames per second (fps), i.e., 4K UHD, 1080p at 120 fps, 1080p at 60 fps, 720p, and 576i. For heuristic algorithms that use the bitrate as a proxy for quality level, the quality levels descend from highest-quality (and highest bitrate) to lowest-quality (and lowest bitrate) in order from 4K UHD, 1080p, 720p, and 576i.

In cases where deep characterization information 110 about content playback system 105 is available, manifest server 130 uses the deep characterization information 110 to determine the subset of manifest data 119 to include in constrained manifest data 120a. For example, manifest server 130 receives a request from media server 125 to generate constrained manifest data 120a for content playback system 105. Media server 125 provides the title (or other type of identifier) of the media content to manifest server 130, along with the deep characterization information 110 of content playback system 105.

Manifest server 130 evaluates the deep characterization information 110 to determine which quality levels are supported by content playback system 105. Because this evaluation does not rely solely on the playback capabilities reported by one component of content playback system 105 (e.g., client device 106) and accounts for potentially more limited capabilities of other system components (e.g., display 108), constrained manifest data 120a represents a more appropriate set of playback options for content playback system 105.

In the example of FIG. 1, client device 106 includes a high throughput wireless network interface and an advanced hardware video codec that together supports UHD streaming. Multimedia interface 107 is a 4K UHD compatible HDMI cable. However, display 108 is a plasma TV with a maximum resolution of 1080P full HD. During playback, display 108 downscales UHD content into full HD, generating visual artifacts in the process that makes the downscaled UHD content of lesser visual quality than the corresponding full HD content. However, using information about all of the components of content playback system 105 obtained by the deep characterization process, manifest server 130 generates constrained manifest data that account for the discrepancies among the playback capabilities of the different components, thereby avoiding the negative consequences of such mismatches.

Manifest server 130 generates constrained manifest data 120a to include selections of the quality levels appropriate for the overall capabilities of content playback system 105 as identified from deep characterization information 110. Constrained manifest data 120a indicates that the fragments of the media content can be requested at the 1080p at 120 fps, 1080p at 60 fps, 720p, and 576i quality levels. Constrained manifest data 120a is provided to content playback system 105 by media server 125. As a result, content playback system 105 can only request fragments at the quality levels specified by constrained manifest data 120a.

Constrained manifest data 120a includes metadata that allows content playback system 105 to generate properly formatted requests for specific fragments of the media content. A sequence of fragments together provides playback of the full media content. Audio portions of the media content can also be provided in fragments. Additional information, such as available subtitles, can also be provided in constrained manifest data 120a. Fragments at the missing quality levels (i.e., UHD) cannot be requested by content playback system 105 because the requests for them cannot be properly made due to their absence from constrained manifest data 120a.

The server side heuristic algorithm that utilizes deep characterization information 110 to generate constrained manifest data 120a is compatible with the presence of heuristic algorithms implemented at content playback system 105. In FIG. 1, the gaming console corresponding to the client device 106 in content playback system 105 utilizes a heuristic algorithm that determines the quality levels at which to select fragments based on the available bandwidth of the Internet connection (or other network connection) that client device 106 uses to communicate with media server 125, along with the availability and capacity of hardware resources, such as the central processing unit (CPU) and memory associated with client device 106. As the available bandwidth increases and/or CPU and memory availability increases, the client-side heuristic algorithm can request higher-quality fragments of the media content for playback by parsing constrained manifest data 120a and selecting higher-quality fragments for requests. As the available bandwidth decreases and/or CPU and memory availability decreases, lower-quality fragments of the media content can then be requested for playback.

Generation of constrained manifest data 120a based on deep characterization information 110 allows for the server side of the content delivery system (e.g., media server 125 and/or manifest server 130) to have more influence over the playback decisions of the media content by any heuristic algorithms implemented on content playback system 105. In the depicted example, client device 106 supports UHD streaming. If client device 106 did not have constrained manifest data 120a that excludes the UHD stream, client device 106 would likely attempt to request UHD fragments under network conditions that would otherwise support the UHD stream. However, the aggressive heuristic algorithm of client device 106 would result in deterioration in the quality of the content playback because the UHD stream would need to be downscaled to fit the capabilities of display 108. Thus, by excluding the UHD stream from constrained manifest data 120a, fragment selection by the heuristic algorithm at the client device 106 can be more accurately aligned with the overall capabilities of content playback system 105.

In the example of FIG. 1, constrained manifest data 120a represents available playback options for segments A through E of the media content. Each segment represents playback of the media content for a given duration (e.g., from 1 minute 30 seconds to 1 minute 50 seconds for segment A, from 1 minute 50 seconds to 2 minutes 10 seconds for segment B, etc.) and has corresponding fragments at four different quality levels, i.e., 1080p at 120 fps, 1080p at 60 fps, 720p, and 576i, each of which is accompanied by 5.1 surround audio.

Deep characterization information 110 is refreshed during playback of the media content to provide updates of at least some of the dynamic parameters associated with content playback system 105. This update (represented by heartbeat transmission 111) provides the refreshed values of the dynamic parameters that may result in some of the options included in constrained manifest data 120a to no longer be appropriate or, conversely, the need for the inclusion of new options.

Assume that the video portion of the media content is being viewed through battery-powered active 3-D glasses 109. At the time of the playback of a fragment corresponding to media content segment A, 3-D glasses 109 have sufficient battery power to perform the active electro-optical polarization switching at 120 fps of the lenses in the 3-D glasses to enable a 3-D viewing experience of the 1080P at 120 fps video. If, after receiving heartbeat transmission 111, media server 125 determines that the battery power in the 3-D glasses 109 is insufficient for playback of subsequent fragments at the same quality level, media server 125 can determine that content playback system 105 should receive updated manifest data that excludes fragments of the media content at 1080P at 120 fps. Using the updated deep characterization information 110, manifest server 130 generates an updated constrained manifest data 120b that media server 125 then provides to content playback system 105 for selection of fragments corresponding to segments subsequent to those represented in constrained manifest data 120a; in this case, segments F-I.

Figure 2:
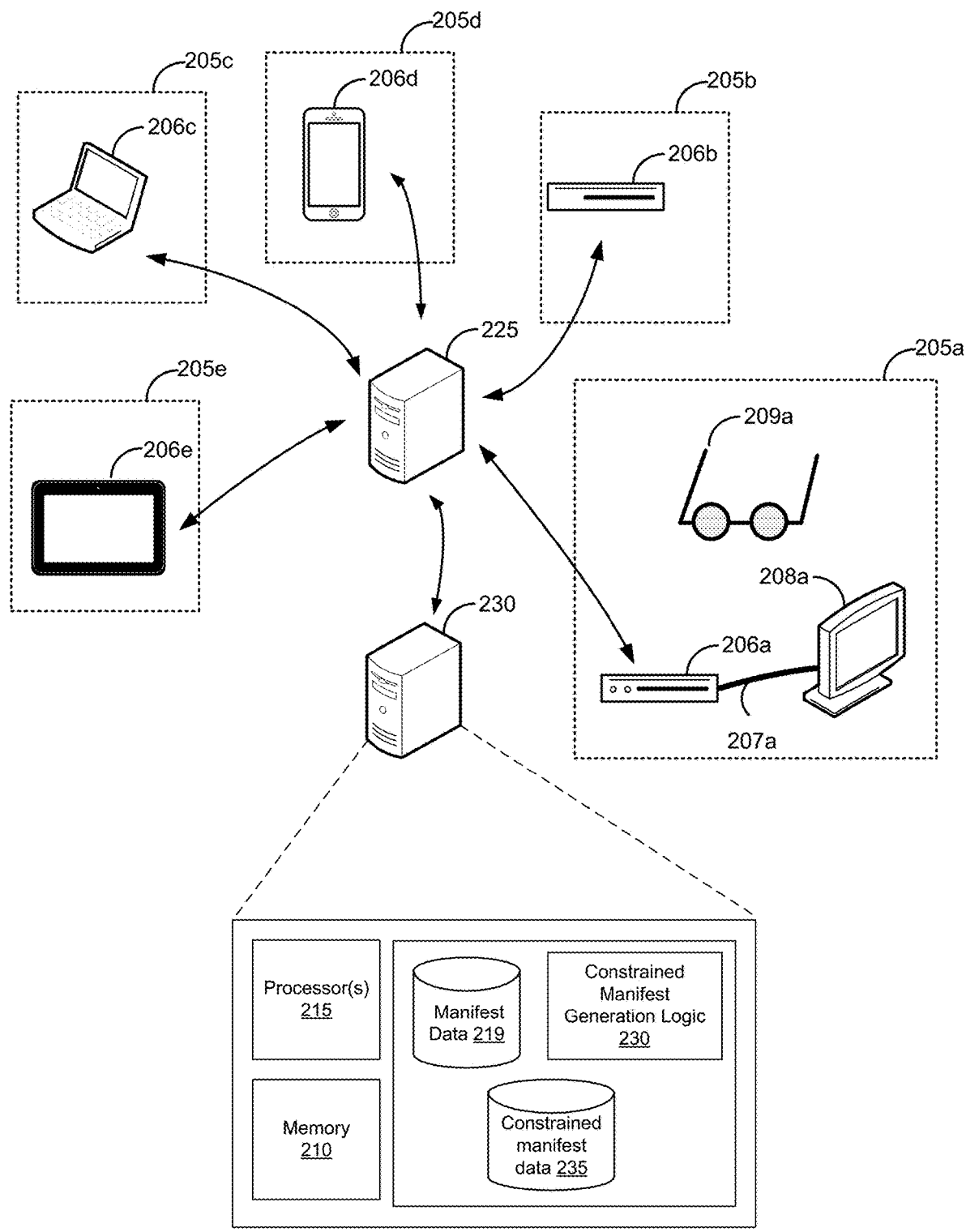
FIG. 2 illustrates an example of a computing environment providing streaming media content.

FIG. 2 illustrates an example of a computing environment providing streaming media content using constrained manifest data. The computing environment of FIG. 2 includes media server 225 that provides constrained manifest data to client devices 206a-e so that they can request and receive fragments of streaming media content. Client devices 206a-e includes smartphones, laptop computers, desktop computers, set-top boxes, video game consoles, tablets, wearable devices, virtual reality headsets, and other electronic devices. Client devices 206a-e are included in respective content playback systems 205a-e. Each of the content playback systems 205a-e includes interconnected components. In FIG. 2, four of the illustrated components in the content playback system 205a are client device 206a (corresponding to a gaming console), multimedia interface 207a, display 208a, and 3-D glasses 209a. For each content playback system 205b-e, components that may be present and that are outside of the respective client devices 206b-e are not illustrated in FIG. 2. For each content playback system 205a-e, components internal to the respective client devices 206a-e are not illustrated in FIG. 2.

It should be noted that, despite references to particular computing paradigms and software tools herein, the computer program instructions on which various implementations are based may correspond to any of a wide variety of programming languages, software tools and data formats, may be stored in any type of non-transitory computer-readable storage media or memory device(s), and may be executed according to a variety of computing models including, for example, a client/server model, a peer-to-peer model, on a stand-alone computing device, or according to a distributed computing model in which various functionalities may be effected or employed at different locations. In addition, reference to particular types of media content herein is merely by way of example. Suitable alternatives known to those of skill in the art may be employed.

Media server 225 may be part of a content delivery system that conforms to any of a wide variety of architectures. The functionality and components of media server 225 can use one or more servers and be deployed at one or more geographic locations (e.g., across different countries, states, cities, etc.) using a network such as any subset or combination of a wide variety of network environments including, for example, TCP/IP-based networks, telecommunications networks, wireless networks, cable networks, public networks, private networks, wide area networks, local area networks, the Internet, the World Wide Web, intranets, extranets, etc. Multiple entities may be involved in the delivery of media content and data related to the media content, including content providers, internet service providers (ISPs), providers of content delivery networks (CDNs), etc. The functionality described herein also may be implemented by one or more of different entities. For example, the functionality is implemented in an edge server or content server of a CDN, a server of an ISP, etc.

In some implementations, media server 225 includes one service using one or more servers to provide constrained manifest data to client devices 206a-e which may request fragments from another service using one or more of the same or other servers of media server 225, such as an edge server of a CDN, based on the constrained manifest data provided by the first service.

In FIG. 2, client devices 206a-e include various types of logic used to implement a video player to provide playback of media content. Client devices 206a-e includes one or more processors, memory, a display, and other hardware components or circuits to request manifest data and fragments of media content to store in a playback buffer. For example, client devices 206a-e includes processors that execute stored instructions in memory to implement parts of the techniques disclosed herein, such as making fragment requests based on the constrained manifest data, performing data acquisition for the deep characterization information, and/or filtering deep characterization information.

In FIG. 2, media server 225 is connected to manifest server 230. Manifest server 230 includes one or more processors 215, memory 210, and other hardware components or circuits to provide constrained manifest data to media server 225, which in turn is provided to client devices 206a-e so that they can request fragments for playback of a media stream.

Manifest server 230 receives deep characterization information from media server 225. Constrained manifest generation logic 230 analyzes the deep characterization information to generate and update constrained manifest data. Constrained manifest data includes data contained in the superset of playback options stored in manifest data 219. Constrained manifest data is stored in constrained manifest data store 235. Constrained manifest generation logic 230 provides constrained manifest data to media server 225 to service a request for media content playback from client devices 206a-e. As will be understood, processors 215 execute stored instructions in memory 210 to implement these and other techniques disclosed herein.

Figure 3:
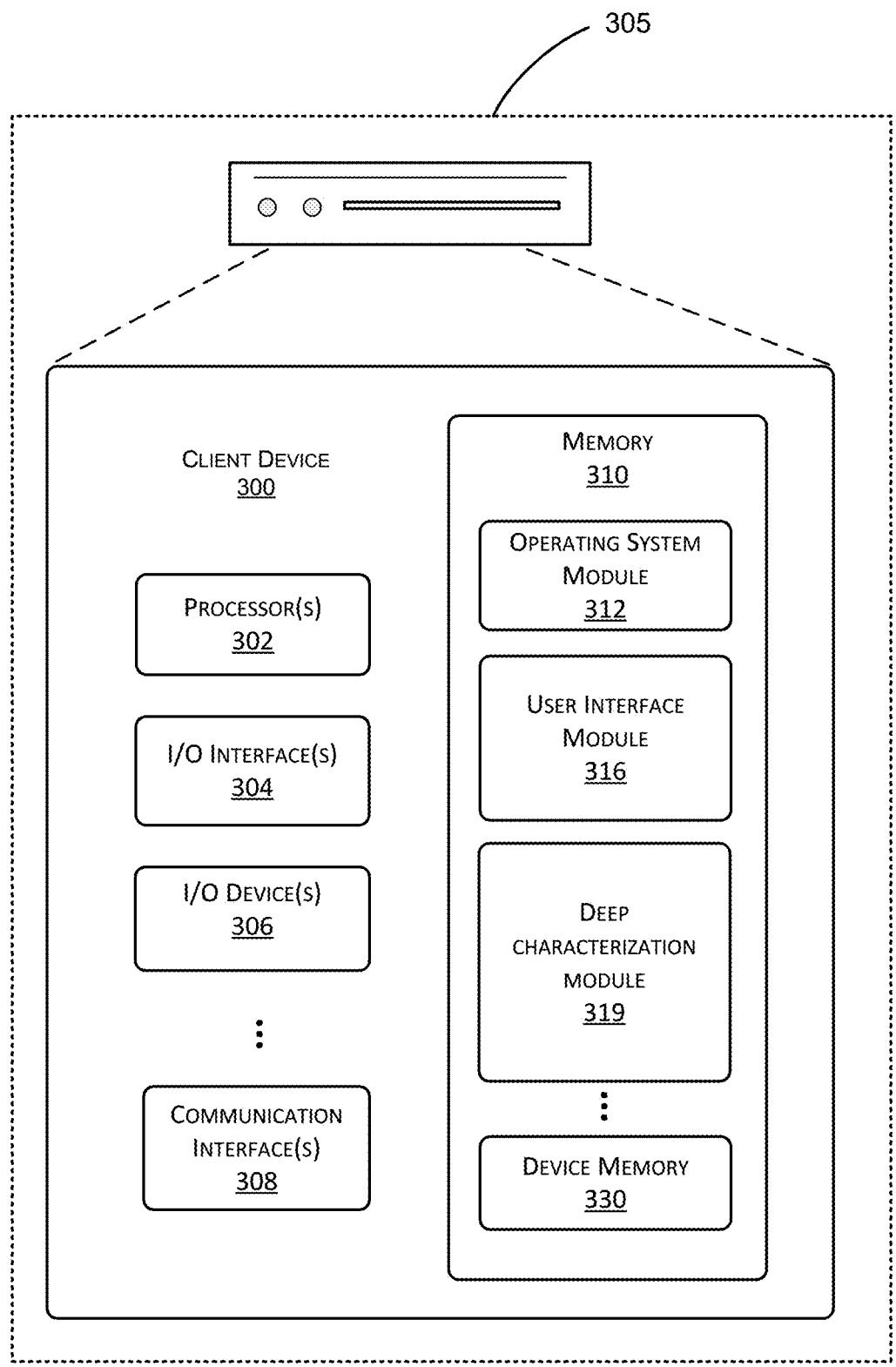
FIG. 3 illustrates an example of a client device configured to consume streaming media content.

A block diagram of an example of a client device 300 suitable for use with various implementations is shown in FIG. 3. Client device 300 is included in content playback system 305. Components outside of client device 300 are not illustrated in FIG. 3. Client device 300 includes one or more single or multi-core processors 302 configured to execute stored instructions (e.g., in device memory 330). Client device 300 may also include one or more input/output (I/O) interface(s) 304 to allow the device to communicate with other devices. I/O interfaces 304 may include, for example, an inter-integrated circuit (I2C) interface, a serial peripheral interface (SPI) bus, a universal serial bus (USB), an RS-232 interface, a media device interface, and so forth. I/O interface(s) 304 is coupled to one or more I/O devices 306. I/O device(s) 306 may include one or more haptic generators, a touch sensor array, one or more accelerometers, one or more image capture systems, one or more motion sensors, one or more orientation sensors, microphones, speakers, and so forth.

Client device 300 may also include one or more communication interfaces 308. Such communication interface(s) 308 may be used to connect to cellular networks, personal area networks (PANs), local area networks (LANs), wide area networks (WANs), and so forth. For example, communications interfaces 308 may include radio frequency modules for a 3G or 4G cellular network, a Wi-Fi LAN and a Bluetooth PAN. Client device 300 also includes one or more buses or other internal communications hardware or software (not shown) that allow for the transfer of data and instructions between the various modules of the device.

Client device 300 also includes one or more memories (e.g., memory 310). Memory 310 includes non-transitory computer-readable storage media that may be any of a wide variety of types of volatile and non-volatile storage media including, for example, electronic storage media, magnetic storage media, optical storage media, quantum storage media, mechanical storage media, and so forth. Memory 310 provides storage for computer readable instructions, data structures, program modules and other data for the operation of client device 300. As used herein, the term "module" when used in connection with software or firmware functionality may refer to code or computer program instructions that are integrated to varying degrees with the code or computer program instructions of other such "modules." The distinct nature of the different modules described and depicted herein is used for explanatory purposes and should not be used to limit the scope of this disclosure.

Memory 310 includes at least one operating system (OS) module 312 configured to manage hardware resources such as I/O interfaces 304 and provide various services to applications or modules executing on processor(s) 302. Memory 310 also includes a user interface module 316 and other modules. Memory 310 also includes device memory 330 to store a wide variety of instructions and information using any of a variety of formats including, for example, flat files, databases, linked lists, trees, or other data structures. In some implementations, a portion of device memory 330 may be distributed across one or more other devices including servers, network attached storage devices, and so forth.

At least some of the logic or computer program instructions used to collect deep characterization information for content playback system 105, represented by deep characterization module 319, may be resident on client device 300. For example, at least some of this functionality may be implemented as part of the code of a media player operating on client device 300. Alternatively, deep characterization module 319 may be implemented separately from the device's media player. Suitable variations and alternatives will be apparent to those of skill in the art. It will also be understood that client device 300 of FIG. 3 is merely an example of a device with which various implementations enabled by the present disclosure may be practiced, and that a wide variety of other devices types may also be used. The scope of this disclosure should therefore not be limited by reference to device-specific details.

Figure 4:
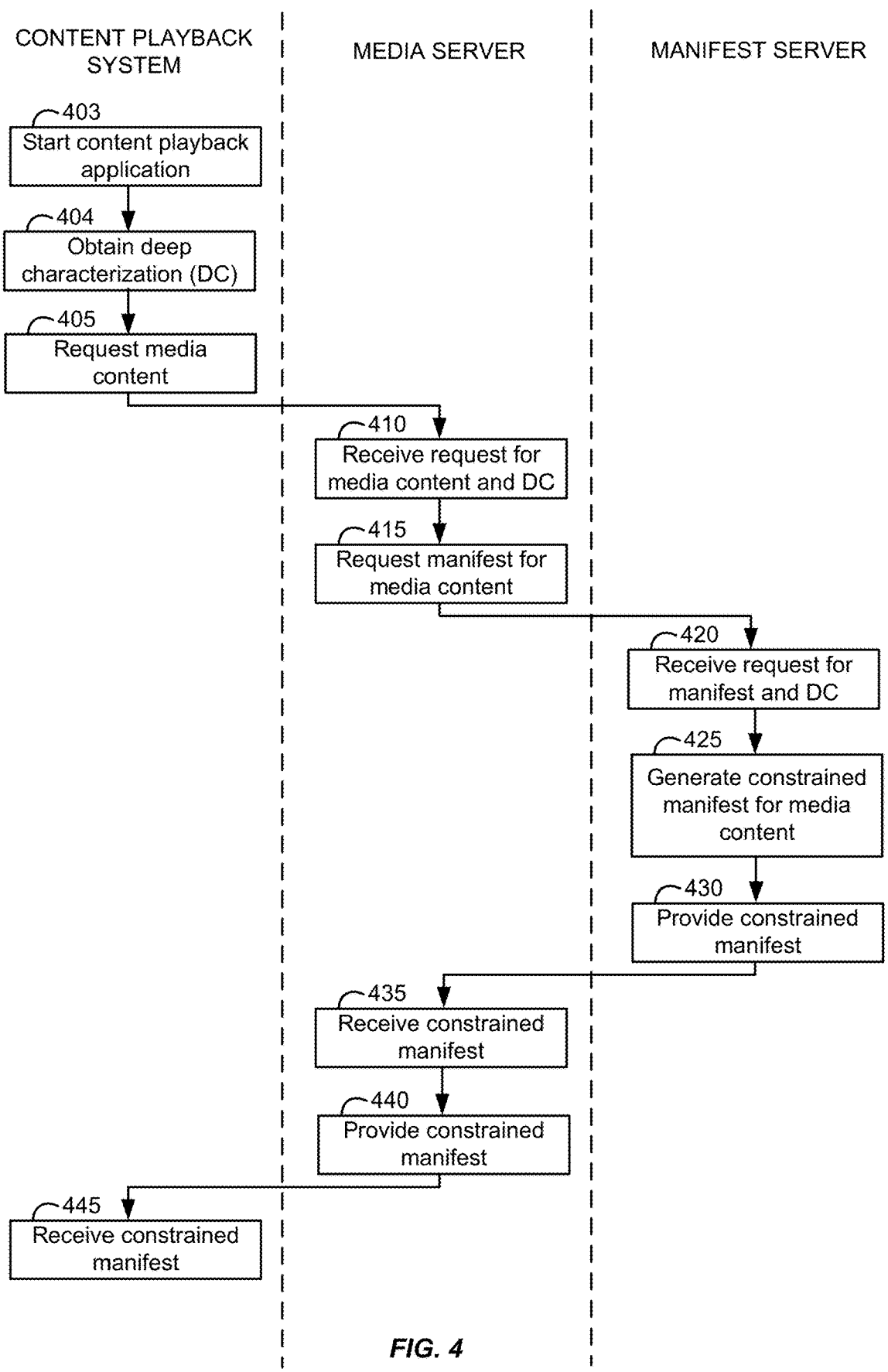
FIG. 4 is a flowchart illustrating an example of server operations for providing constrained manifest data.

FIG. 4 is a flowchart illustrating the use of deep characterization information to generate constrained manifest data to improve management of the playback of media content. A content playback application residing on a client device within the content playback system is started (403). The content playback system includes several interconnected components. For example, the content playback system includes a gaming console with a wired HDMI connection to a 100 inch home theater projector. The gaming console has a Wi-Fi or Ethernet connection to the Internet, thereby serving as the client device that communicates with the media server in the CDN.

In some implementations, more than one component in the content playback system has connectivity to the Internet. For example, both a gaming console and a smart television that the gaming console is connected to may have direct Internet connectivity. However, only one of the components, such as the gaming console, serves as the client device for making media content requests to the CDN.

The content playback system can have both active and passive components. Active components include powered devices such as, for example, the gaming console, the projector, subwoofers, etc. Passive components include an unpowered HDMI cable, audio cables, unpowered signal splitters (e.g., to connect to separate displays simultaneously), unpowered signal multiplexers (e.g., to connect one display to multiple HDMI signal sources), etc.

The content playback system can have interconnections between physically distinct components that are either wired or wireless. The HDMI cable is a physically distinct component from the gaming console and the projector, and is interconnected through a HDMI compliant I/O interface. In some implementations, the gaming console and the projector is interconnected through a wireless protocol such as the MiraCast or WiDi standards. Wireless interconnections between components can have both static and dynamic characteristics, such as a maximum available bandwidth and currently used bandwidth on a wireless LAN. The content playback system can include components made by different manufacturers. For example, the components with different manufacturers can be in different devices, such as a Nintendo gaming console and a Sony plasma television. The components with different manufacturers can also be in the same integrated device, such as an NVidia graphics chip and a QUALCOMM mobile processor in a smart phone. The content playback system can include components corresponding to different time periods of development for a particular technology, such as 802.11 Wi-Fi (e.g., a/b/g, n, ac), HDMI (1.0, 2.0), or Ethernet (10/100 Mbps, Gigabit Ethernet). The content playback system can include components to enable interconnection of other components, such as a HDMI to component video converter box, to enable interconnecting a digital streaming video device (e.g., Amazon Fire TV, Apple TV, or Google Chromecast) to a legacy analog CRT television.

As demonstrated in the above examples, the content playback system can include a variety of components located in an integrated device and/or distributed across different devices, each with a wide range of characteristics and corresponding capabilities, each of which can impact the overall content playback capabilities of the system. Situations that negatively impact content playback, e.g., degraded audio and/or video quality, system malfunction, etc., arise from the diversity in manufacturers, device configurations, support for technology standards, and solutions for backwards compatibility that may be present in a content playback system. Obtaining and analyzing deep characterization information enables detection of such situations and mitigation of the negative impact on playback.

A deep characterization module (e.g., module 319) integrated in the content playback application or accessible through an application programming interface performs a process for acquisition of deep characterization information (404). Deep characterization information is obtained by the deep characterization module through operating system queries and/or available application programming interfaces. In some implementations, all (or substantially all) parameters available through the operating system and/or available application programming interfaces are requested. The deep characterization module filters out content playback system parameters that are identified to not affect content playback. In other implementations, the deep characterization module only queries for parameters determined to affect content playback.

The parameters that characterize the content playback system are static parameters (maximum CPU speed, screen size, total RAM, device manufacturer, etc.) and dynamic parameters (remaining battery life, number of battery charge/discharge cycles, current screen brightness, etc.).

In certain implementations, the deep characterization module can access sources of information external to the content playback system to obtain deep characterization information. External sources include, for example, a remote database storing a lookup table indexed by device ID, the remote database providing a collection of characteristics and corresponding parameter values associated with a particular device ID. This may allow identification of characteristics and parameter values that are unable to be queried due to software limitations, lack of availability in the playback system, or security restrictions. Another external source is a web scraping interface that extracts content playback system information from user discussion forums, reverse engineering reports, auction sites, product manuals, product review websites, RSS feeds, Twitter feeds, social networking sites, etc. For example, the web scraping interface can use a model number and firmware version obtained by the deep characterization module to crawl the web and detect a software bug. This is done by, for example, detecting that users on a social networking service have been discussing how the particular firmware version detected has been associated with playback issues at a particular image resolution that did not have playback issues for an older firmware version. As another example, the product purchase history (e.g., a recently purchased TV) of a user associated with the client device requesting media content is used to determine the possible presence of particular components in the content playback system.

Deep characterization information is stored in a variety of formats that allow the client device to optionally filter the contents prior to transmission to a media server, and for the media server to interpret the received information. The rules to filter portions of the deep characterization information are established at the media server and indicated to the client device, or the client device itself establishes filtering rules. In some implementations, deep characterization information is stored as structured data based on a schema, such as Extensible Markup Language (XML), JavaScript Object Notation (JSON) and Comma-Separated Values (CSV). Deep characterization information can also be stored as non-structured data.

The content playback system generates a request for media content from a CDN (405). The request is generated, for example, by selecting an episode of a television show for playback from a video streaming service in a web browser or software program. In some implementations, the request for media content is generated after the deep characterization information is obtained. In other implementations, the request is generated prior to collection of the information.

The request for media content and the deep characterization information is provided to and received by the media server (410). The request and deep characterization information is provided to the media server using a variety of signaling mechanisms. In some implementations, the request is signaled using parameters in an HTTP request for manifest data corresponding to the requested media content.

The media server requests manifest data for the specific media content (e.g., the particular episode selected for playback from the video streaming service) from the manifest server (415). For example, the media server can provide an identifier of the specific media content (e.g., title, catalog number, episode number, etc.) to the manifest server. Additionally, the media server provides the deep characterization information stored in either a structured schema or as unstructured data.

Additional information regarding the request received from the client device, such as information regarding authentication, encryption, and content access privileges associated with the client device, is provided to the manifest server. As a result, the manifest server receives the request, as well as the deep characterization information and additional information (420). In certain implementations, deep characterization information is analyzed at a server separate from the manifest server. For example, deep characterization information can be analyzed at the media server, or at an intermediate server between the media server and the manifest server.

The manifest server generates constrained manifest data using the deep characterization information provided by the media server (425). In some implementations, the manifest server generates constrained manifest data using the results of analysis of the deep characterization information by a separate server. The constrained manifest data corresponds to a subset of the superset of available configurations of the requested media content stored in manifest data (e.g., 119), which includes all the available configurations of the media content that differ in encoding, compression, content protection technology and other media content parameters known in the art. The constrained manifest data serves as a mechanism for enforcing the results of the analysis of the deep characterization information.

Different combinations of data in the deep characterization information provided by the media server correspond to different constrained manifest data. For example, for the same media content, content playback systems with different content playback capabilities may receive different constrained manifest data. Similarly, content playback systems that include identical components (e.g., identical client devices, multimedia interfaces, and displays), but have parameter values that correspond to different values (e.g., different battery charge states) may receive different constrained manifest data. The playback options contained in the constrained manifest data are selected to ensure compatibility with the different capabilities of the components in the content playback system. For example, compatibility is ensured across different components for the same characteristic, such as image resolution, which for a gaming console, may be limited by an internal graphics processor and graphics memory, and for a display, may be limited based on the pixel display technology used. The manifest server determines the playback options that are compatible with both the gaming console and the display, and thereby excludes playback options that would only be supported by the gaming console or the display. Selecting playback options that are compatible includes determining the highest value (or lowest value) for a particular content playback parameter that is supported by both the gaming console and the display, or the largest set of values supported by both the gaming console and the display.

In some implementations, the value obtained for a queryable parameter provides a direct mapping to a capability associated with a particular content playback parameter. For example, a particular content parameter for a content playback system, such as a tablet mobile device, is the maximum image resolution supported. A queryable parameter for a component in the content playback system (i.e., the tablet), such as a built-in organic LED display, may include maximum resolution for the display, as indicated by the device_feature|resolution|max-resolution query emphasized in bold in the excerpt of queryable parameters in Table 1 below.

[Table 1]
device_query: [[only|not]?<device_type>[and <expression>]*]
|<expression>[and <expression>]*
expression: (<device_feature>[: <value>]?)
...
device_type: all|aural|braille|handheld|print|
    projection|screen|tty|tv|embossed
device_feature:
    |identifier|device-ID|model-number|FCC-registration
    |height|min-height|max-height
    |width|min-width|max-width
    |display-density|min-display-density|max-display-density
    |device-width|min-device-width|max-device-width
    |device-height|min-device-height|max-device-height
    |aspect-ratio|min-aspect-ratio|max-aspect-ratio
    |device-aspect-ratio|min-device-aspect-ratio|max-device-aspect-ratio
    |color-depth|min-color-depth|max-color-depth
    |color-index|min-color-index|max-color-index
    |monochrome|min-monochrome|max-monochrome
    |resolution|min-resolution|max-resolution
    |scan|grid In certain implementations, the value obtained for a queryable parameter provides an indirect mapping to a capability associated with a particular content playback parameter. Continuing with the above example, a queryable parameter for a component in the content playback system is a device ID, as indicated by the device|identifier|device-ID query in Table 1 above. The device-ID can be used as an index to perform a lookup in a database that stores the maximum image resolution associated with the device identifier.

In yet other implementations, when there is no queryable parameter that provides either a direct or an indirect mapping to a capability associated with a particular content playback parameter, a heuristic function is used to infer the capability. For example, due to security restrictions, both the maximum resolution and device ID are not queryable parameters for the display component in the tablet. Therefore, deep characterization information does not include any parameter values that can be used to directly obtain, or indirectly lookup, a maximum image resolution capability for the built-in display. Instead, a heuristic function uses other queryable parameters, which themselves have no direct or indirect mapping to a maximum image resolution, to infer a maximum image resolution for the built-in display.

In one implementation, a heuristic function may combine parameter values relating to device type, maximum values for device height, width, and color depth, to obtain a device ID that can then be used to perform a lookup of maximum image resolution supported. For example, the heuristic function receives the entire set of deep characterization information, which includes information that indicates the device type is a handheld with a 27 inch height, a 20 inch width, and an 8-bit image depth. Using this subset of information, the heuristic function can recognize the device as being in the category of commercial tablets targeting architectural and engineering blueprint applications, which involve large displays with limited color depth, to determine a set of likely device IDs to perform a lookup for maximum image resolution supported.

In another implementation, a heuristic function may combine parameter values relating to screen size and screen density to infer a maximum image resolution supported without relying on a lookup. For example, the heuristic function receives deep characterization information indicating the screen size is 10.7"×7", and that the screen density, the quantity of pixels within a physical area of the screen, usually referred to as dpi (dots per inch), is within a range considered to be extra-extra-extra-high by the Android 3.2 and above operating systems (i.e., xxxhdpi, corresponding to approximately 640 dpi). Recognizing that the screen dimensions are popular for personal movie viewing, and the presence of the highest possible category of pixel density, the heuristic function infers that UHD is supported by the display. The process for generating constrained manifest data can subsequently use this inferred UHD capability when comparing with maximum image resolutions supported by other components in the content playback system. Thus, the heuristic function is adaptable such that different subsets of parameters within the deep characterization information can be analyzed to derive the same capability for a particular content playback parameter.

In addition to being adaptable, the heuristic function is dynamic. Heartbeat transmission (e.g., 111) provides a time varying input into the heuristic function. Examples of time varying inputs include battery status, network bandwidth, and mobility information (e.g., tracking IP addresses to determine changing locations). For instance, when detecting the IP address of a mobile device corresponds to a home Wi-Fi network, a UHD capability is included in the constrained manifest data. If the IP address is determined to correspond to a public Wi-Fi network with inconsistent network bandwidth conditions, such as a Starbucks coffee shop, even though the content playback system hardware supports UHD, the heuristic function accounts for environmental constraints that may negatively impact the playback quality, and therefore excludes UHD.

In certain implementations, the heuristic function incorporates a machine learning capability that adjusts to changes in the types of information contained in deep characterization information. For example, as deep characterization module (e.g., 319) scrapes external information sources, such as forums, product manuals, and social networking sites, the inferential relationship between a capability for a particular content playback parameter and a particular subset of information in the deep characterization information may be learned. For instance, the heuristic function may have ignored the software attributes for version 1.0 of a particular firmware. However, upon incorporating information obtained from a discussion forum that version 1.1 of the firmware causes the mobile device to behave erratically when playing back UHD content, the heuristic function can begin to incorporate the firmware version number when determining compatible capabilities for the purposes of generating constrained manifest data.

Compatibility is not limited to scenarios where a particular playback option would be nonfunctional on a component. Rather, reference to compatibility also accounts for scenarios where a playback option would be functionally supported, but would result in degraded content playback. For example, both the gaming console and the display may support UHD, but the display may have a native resolution of 1080p, thereby resulting in degradation of the image quality when displaying UHD. In such scenarios, constrained manifest data would exclude the UHD playback option.

The constrained manifest data is generated by the manifest server and provided to the media server (430). Though the above examples describe providing manifest data that exclude certain video quality levels of the manifest data for the media content, other data can be excluded in the generated constrained manifest data. For example, audio quality levels (of the audio portion of the playback) can be selected to generate a constrained manifest data based on any of the aforementioned determinations. In some implementations, the constrained manifest data can exclude playback options based on incompatibilities in encryption technology, language capabilities and/or other media content configuration parameters.

The media server receives the constrained manifest data generated by the manifest server (435) and provide the constrained manifest data to the client device (440). The client device receives the constrained manifest data (445) and begins playback of the media content by requesting a fragment at one of the quality levels indicated in the generated constrained manifest data. As a result, the request for the fragment is received by the media server, which retrieves and provides the requested fragment to the client device. The client device can subsequently receive the fragment and store the fragment in a buffer for playback.

Figure 5:
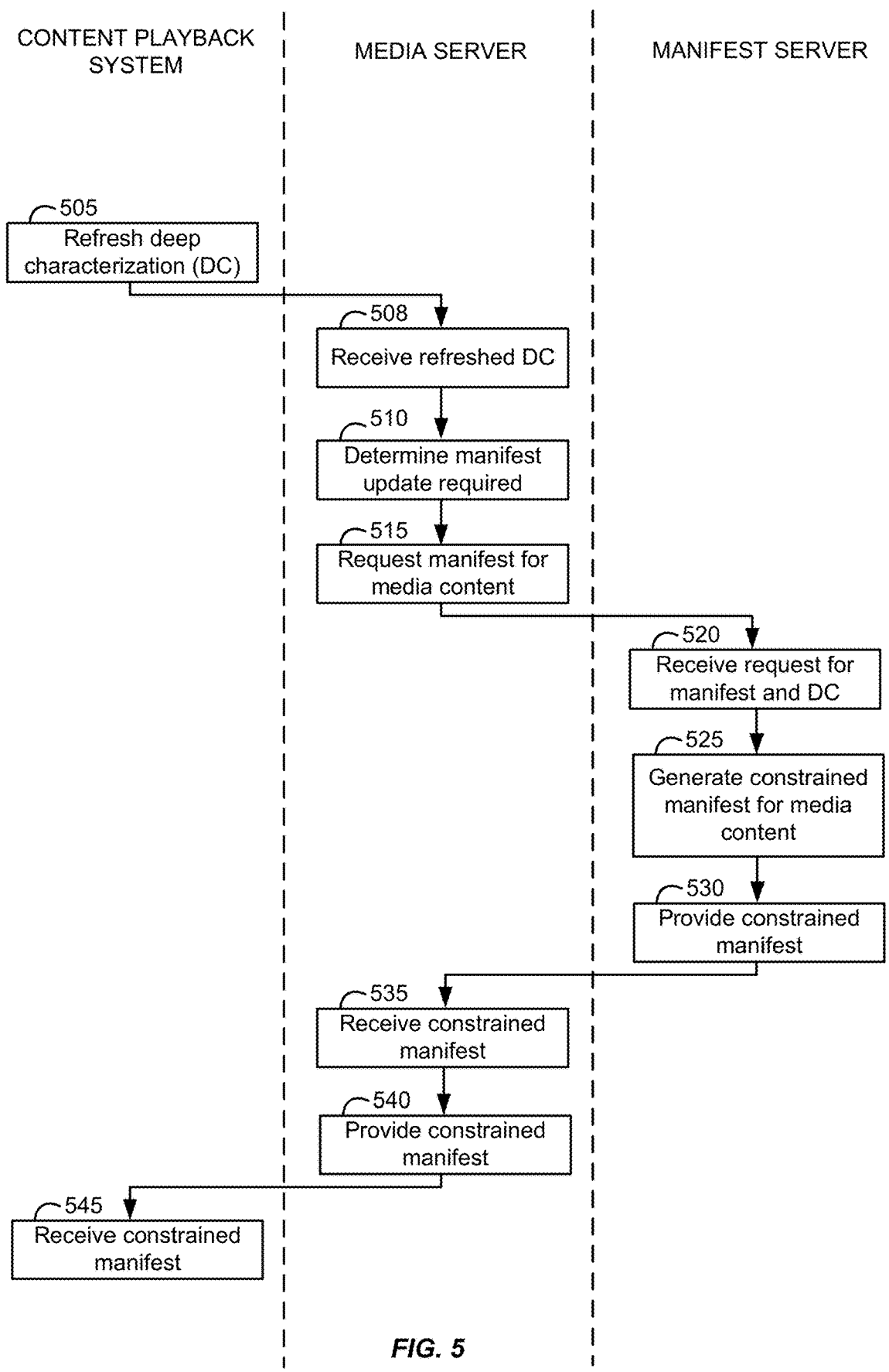
FIG. 5 is a flowchart illustrating an example of server operations for providing updated constrained manifest data.

FIG. 5 is a flowchart illustrating that the constrained manifest data is updated or replaced due to changing conditions in the content playback system during the playback of requested media content. The manifest server generates the new constrained manifest data and pushes the information to the client device. In some implementations, the client device requests to receive new constrained manifest data at periodic intervals.

The deep characterization module periodically refreshes deep characterization information by re-issuing queries to the operating system and/or application programming interfaces (505). The deep characterization information is provided to and received by the media server through the heartbeat transmission (e.g., 111) (508). For example, the audio portion of the media content is being played back on a battery-powered wireless headphone with three audio drivers for each ear. At the time of the media content playback corresponding to fragment A shown FIG. 1, the wireless headphone has sufficient battery power to perform the digital signal processing to decode a virtual 5.1 surround sound audio stream. After receiving the heartbeat transmission, the media server determines that the wireless headphone does not have sufficient battery to play back the remainder of the media content using the virtual 5.1 surround sound algorithm (510). The media server also determines that the wireless headphone has sufficient battery power to play the remainder of the media content using the 2.1 surround sound algorithm.

In some implementations, the content playback system is a single battery-powered mobile device including a network interface, a processor capable of video decoding, and a display. The mobile device provides battery level updates to the media server through the heartbeat transmission. After receiving the heartbeat transmission, the media server determines that the mobile device does not have sufficient battery to play back the remainder of the media content at UHD, thereby necessitating an updated constrained manifest file. The media server also determines that the mobile device is capable of operating the processor performing video decoding in a low power mode, and that the low power mode only supports a lower maximum resolution of 720p. The media server requests updated constrained manifest data from the manifest server (515). The manifest server receives the request, as well as either the deep characterization information or the results of an analysis of the deep characterization information as performed by the media server or another intermediate server (520). The manifest server generates updated constrained manifest data using the deep characterization information provided by the media server (525). The updated constrained manifest data indicates subsequent fragments can only be requested for audio quality levels corresponding to 2.1 surround audio, rather than virtual 5.1 surround audio.

The updated constrained manifest data is generated by the manifest server and provided to the media server (530). The media server receives the updated constrained manifest data generated by the manifest server (535) and provides the updated constrained manifest data to the client device (540). The client device receives the updated constrained manifest data (545) and begins playback of the media content by requesting a fragment at one of the playback options indicated in the updated constrained manifest data.

While the subject matter of this application has been particularly shown and described with reference to specific implementations thereof, it will be understood by those skilled in the art that changes in the form and details of the disclosed implementations may be made without departing from the spirit or scope of the invention. Examples of some of these implementations are illustrated in the accompanying drawings, and specific details are set forth in order to provide a thorough understanding thereof. It should be noted that implementations may be practiced without some or all of these specific details. In addition, well known features may not have been described in detail to promote clarity. Finally, although various advantages have been discussed herein with reference to various implementations, it will be understood that the scope of the invention should not be limited by reference to such advantages. Rather, the scope of the invention should be determined with reference to the appended claims.

What is claimed is:

1. A computing system, comprising:
one or more processors and memory configured to:
receive from a client device a request to play back media content;
receive a first parameter value and a second parameter value from a first component of a plurality of interconnected components of a content playback system, the first parameter value representing a characteristic of the first component, and the second parameter value representing a characteristic of a second component of the content playback system, wherein the characteristic of the first component and the characteristic of the second component correspond to different capabilities of the first component and the second component for a particular content playback parameter, and wherein the first component and the second component are configured, as part of the content playback system, to facilitate playback of the media content requested by the client device, the first component is part of the client device, and the second component is discrete from the client device;
determine the capability of the second component corresponding to the particular content playback parameter by using the second parameter value as a database index;

generate manifest data representing content playback versions of media content at a plurality of quality levels, the content playback versions being selected to ensure compatibility with the different capabilities of the first component and the second component and representing a subset of less than all of a superset of content playback versions; and transmit the manifest data to the first component of the content playback system.

2. The computing system of claim 1, wherein the one or more processors and memory are further configured to:

receive a third parameter value and a fourth parameter value from the first component of the content playback system, the third parameter value and the fourth parameter value each representing characteristics of a third component of the content playback system that do not correspond to a capability of the third component for the particular content playback parameter;

determining the capability of the third component for the particular content playback parameter by using a heuristic function using the third parameter value and the fourth parameter value as inputs;

wherein the one or more processors and memory are configured to generate the manifest data by selecting the content playback versions to ensure compatibility with the different capabilities of the first component and the second component and the capability of the third component.

3. The computing system of claim 1, wherein the one or more processors and memory are further configured to:

receive an updated first parameter value;

generate updated manifest data representing updated content playback versions of media content at a plurality of quality levels, the updated content playback versions being selected to ensure compatibility with the capabilities of the first component and the second component as reflected by the updated first parameter value and the second parameter value; and transmit the updated manifest data to the first component of the content playback system.

4. The computing system of claim 3:

wherein the updated first parameter value corresponds to a dynamic characteristic of the first component that can vary during the playback of the media content, and the second parameter value corresponds to a static characteristic of the second component that does not vary during playback of the media content.

5. The computing system of claim 1 wherein the one or more processors and memory are further configured to generate the manifest data by determining at least one of:

a highest value for the particular content playback parameter that is supported by both the first component and the second component, a lowest value for the particular content playback parameter that is supported by both the first component and the second component, or a largest set of values for the particular content playback parameter in which each value in the largest set is supported by both the first component and the second component.

6. The computing system of claim 1, wherein the one or more processors and memory are further configured to:

identify a third parameter value associated with at least one component of the content playback system; and transmit an indication to the first component not to provide the third parameter value.

7. The computing system of claim 1, wherein the one or more processors and memory are configured to generate the manifest data by:

determining the capability of the first component or the second component for the particular content playback parameter by accessing an information source external to the content playback system, the information source being one of a discussion forum, a product manual, a reverse engineering report, an auction site, a review, an RSS feed, a social media feed, a social networking site, or a purchase history.

8. A device, comprising:

one or more processors and memory configured to:

request media content for playback;

determine a first parameter value and a second parameter value for a content playback system, the content playback system having a plurality of interconnected components including the device, the first parameter value representing a characteristic of the device, and the second parameter value representing a characteristic of a second component of the content playback system, wherein the characteristic of the device and the characteristic of the second component correspond to different capabilities of the device and the second component for a particular content playback parameter, and the second component is discrete from the device;

transmit the first parameter value and second parameter value to a media server;

receive manifest data representing content playback versions of media content at a plurality of quality levels, the content playback versions being selected to ensure compatibility with the different capabilities of the device and the second component and representing a subset of less than all of a superset of content playback versions, wherein the capability of the second component for the particular content playback parameter is determined by using the second parameter value as a database index; and facilitate playback of the media content using the second component of the content playback system by selecting from among the content playback versions represented in the manifest data.

9. The device of claim 8, wherein the one or more processors and memory are further configured to:

determine a third parameter value and a fourth parameter value of the content playback system, the third parameter value and the fourth parameter value each representing characteristics of a third component of the content playback system that do not correspond to a capability of the third component for the particular content playback parameter;

transmit the third parameter value to the media server;

wherein the one or more processors and memory are configured to receive manifest data representing content playback versions of media content at a plurality of quality levels, the content playback versions being selected to ensure compatibility with the different capabilities of the device and the second component and the capability of the third component;

further wherein the capability of the third component for the particular content playback parameter is determined by using a heuristic function using the third parameter value and the fourth parameter value as inputs.

10. The device of claim 8, wherein the one or more processors and memory are further configured to:

transmit an updated first parameter value;

receive updated manifest data representing updated content playback versions of media content at a plurality of quality levels, the updated content playback versions being selected to ensure compatibility with the capabilities of the device and the second component as reflected by the updated first parameter value and the second parameter value.

11. The device of claim 10:
wherein the updated first parameter value corresponds to a dynamic characteristic of the device that can vary during the playback of the media content, and the second parameter value corresponds to a static characteristic of the second component that does not vary during playback of the media content.

12. The device of claim 8, wherein the one or more processors and memory are further configured to:
identify a third parameter value associated with at least one component of the content playback system;
generate an indication not to provide the third parameter value to the media server.

13. The device of claim 8, wherein the one or more processors and memory are further configured to:
determine at least one of the first parameter value or second parameter value by accessing an information source external to the content playback system, the information source being one of a discussion forum, a product manual, a reverse engineering report, an auction site, a review, an RSS feed, a social media feed, a social networking site, or a purchase history.

14. A computer-implemented method, comprising:
receiving from a client device a request to play back media content;
receiving from the client device a first parameter value and a second parameter value for a particular content playback parameter, the first parameter value representing a capability of a first component of the client device for the particular content playback parameter, and the second parameter value representing a capability of a second component for the particular content playback parameter, wherein the capability of the first component and the capability of the second component correspond to different capabilities of the first component and the second component for the particular content playback parameter, wherein the first component and the second component are included in a content playback system configured to play back the media content requested by the client device, and the second component is discrete from the client device;
determining for the second component the capability corresponding to the particular content playback parameter by using the second parameter value as a database index;
generating manifest data representing content playback versions of media content at a plurality of quality levels, the content playback versions being selected to ensure compatibility with the different capabilities of the first component and the second component and representing a subset of less than all of a superset of content playback versions; and
transmitting the manifest data to the client device.

15. The computer-implemented method of claim 14, further comprising:
receiving a third parameter value and a fourth parameter value from the first component of the content playback system, the third parameter value and the fourth parameter value each representing characteristics of a third component of the content playback system that do not correspond to a capability of the third component for the particular content playback parameter;
determining the capability of the third component for the particular content playback parameter by using a heuristic function using the third parameter value and the fourth parameter value as inputs;
wherein generating the manifest data includes selecting the content playback versions to ensure compatibility with the different capabilities of the first component and the second component and the capability of the third component.

16. The computer-implemented method of claim 14, further comprising:
receiving an updated first parameter value;
generating updated manifest data representing updated content playback versions of media content at a plurality of quality levels, the updated content playback versions being selected to ensure compatibility with the capabilities of the first component and the second component as reflected by the updated first parameter value and the second parameter value; and
transmitting the updated manifest data to the first component of the content playback system.

17. The computer-implemented method of claim 14, wherein generating the manifest data includes determining at least one of:
a highest value for the particular content playback parameter that is supported by both the first component and the second component, a lowest value for the particular content playback parameter that is supported by both the first component and the second component, or a largest set of values for the particular content playback parameter in which each value in the largest set is supported by both the first component and the second component.

* * * * *